J. SMITH.
APPARATUS FOR TESTING MINE GASES.
APPLICATION FILED JUNE 11, 1909.

944,247.

Patented Dec. 21, 1909.

Witnesses
J. G. Hinkel
Charles N. Murray.

Inventor
Joseph Smith
by Eugene C. Brown
Attorneys

UNITED STATES PATENT OFFICE.

JOSEPH SMITH, OF TRINIDAD, COLORADO.

APPARATUS FOR TESTING MINE-GASES.

944,247.  Specification of Letters Patent.  Patented Dec. 21, 1909.

Application filed June 11, 1909.  Serial No. 501,509.

*To all whom it may concern:*

Be it known that I, JOSEPH SMITH, a citizen of the United States, residing at Trinidad, in the county of Las Animas and State of Colorado, have invented certain new and useful Improvements in Apparatus for Testing Mine-Gases, of which the following is a specification.

My invention relates to apparatus for testing mine gases, and is especially intended to detect the presence of very small percentages of inflammable gases in the air of mines.

The object of my invention is to provide a portable apparatus which may be easily carried and is adapted to be taken into the mine to the very seat of danger for the purpose of determining the character and percentage of inflammable gas that may be present therein.

It has heretofore been proposed to withdraw samples of the gas from the mine by pumping it through a series of pipes or conduits to the outside of the mine and there testing the same by the character of the explosion when ignited. Aside from the great inconvenience and expense of all such methods, it is impracticable if not impossible to make a proper test at a distance. The test must be made at the seat of danger where the instrument can be placed or thrust into the gas or atmosphere which is to be tested without danger of changing the character or the exact mixture naturally existing in the mine. Moreover, the apparatus must be such that there can be no danger incident to its use in the presence of the gaseous atmosphere.

My present invention enables the operator to carry the apparatus to the place where the gas exists, and to introduce the gas or atmosphere directly without piping or conveying is to a distance, thus obviating the difficulties which have heretofore attended such tests.

The invention will be clearly understood from the following description, especially when taken in connection with the accompanying drawings, in which—

Figure 1:
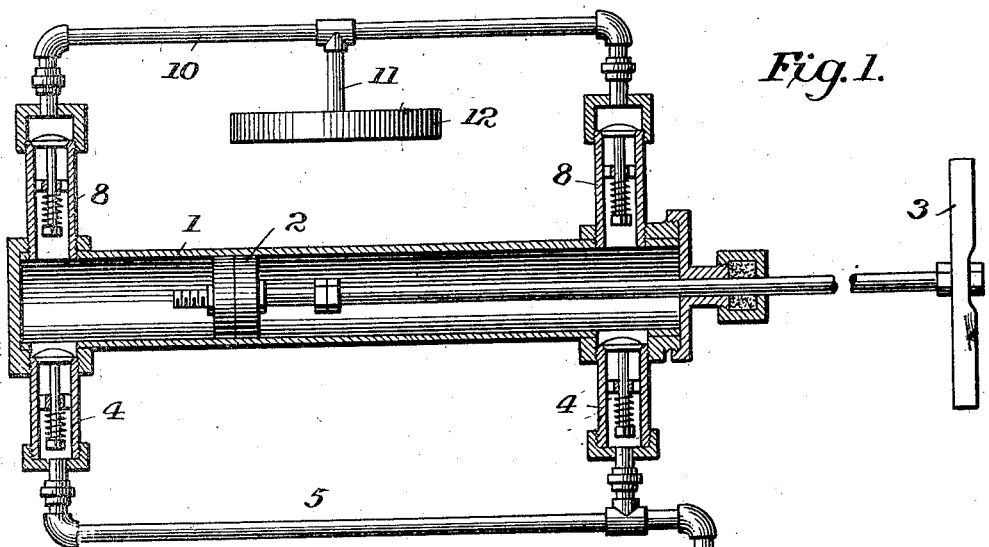
Figure 2:
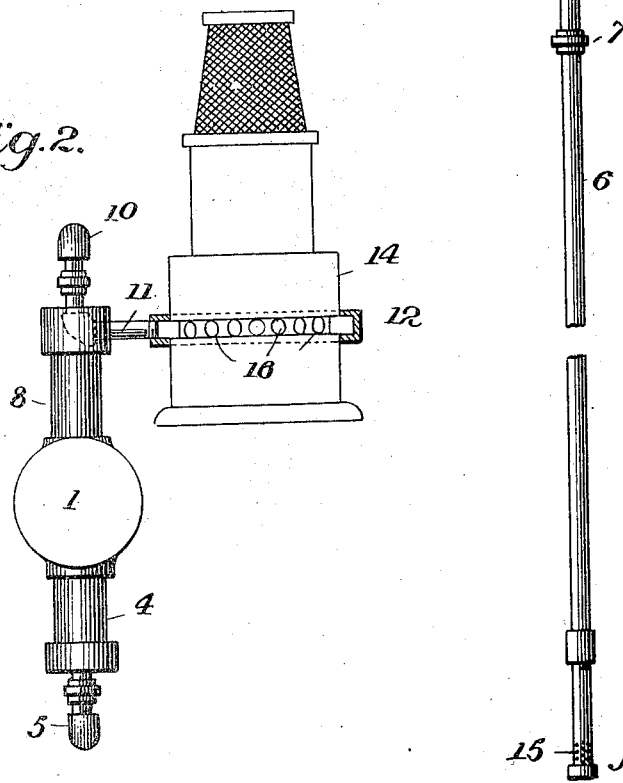

Figure 1 is a longitudinal section of my testing apparatus; and Fig. 2 is an end view thereof, showing also the manner of connecting the testing lamp.

A pump cylinder or barrel 1, having a plunger 2, which may be reciprocated by means of a suitable handle 3, is connected at each end through valve-controlled ducts 4, with the pipe 5, to which an extension pipe 6 is joined by a union 7. The pump cylinder is also connected through valved-ducts 8, at opposite ends, with a common pipe 10, to which is centrally connected the branch pipe 11, carrying a channeled ring 12, by means of which a testing lamp 14, may be connected to the apparatus. I prefer to use a lamp of the type known as the "Wolf safety lamp" that will definitely indicate the presence of as small an amount as two per cent. of marsh gas in the atmosphere,—which is far below that required when an explosive mixture is necessary for the test.

It will be observed that the valves in each of the ducts connected with the pump cylinder are normally held to their seats by springs and that they are arranged to yield only to pressure tending to raise them from their seats and to be firmly held to their seats by pressure in the opposite direction.

When it is desired to make a test, the apparatus having been carried to the place where the gas is present. the extension pipe 6, which may be a single length of one-eighth inch pipe closed at its outer end except for the holes 15 serving as a filter, is thrust into the place where the gas is supposed to exist. Upon reciprocating the plunger 2, the gas is alternately drawn into the cylinder and forced through the pipes 10 and 11 into the channeled ring 12 which surrounds and covers the apertures 16 leading into the combustion chamber of the lamp. Now by observing the character of the flame, the appearance of the tip and the height of the flame, in a manner well known to those experienced in photometric measurements, the percentage of inflammable gas mixed with the atmosphere tested will be accurately known.

My apparatus is very light and may be easily carried from place to place by the operator. The length of pipe 6 may be disconnected at the union 7, making the apparatus very compact. By reason of the fact that there is no explosion attending the use of my apparatus and merely small quantities of gas sufficient to affect the character of the flame within a safety lamp, there is no danger in making a test. Moreover, the indications are exceedingly delicate, enabling one to detect the presence of dangerous gases far too small to cause actual explosions.

It will be obvious to those skilled in the art that various changes may be made in the details of my apparatus without departing from the spirit of my invention.

Having now clearly set forth my invention and the manner of using the same, I claim—

1. A portable apparatus for testing mine gases comprising a tubular chamber, a reciprocable plunger therein, a conduit, valved connections at either end of said chamber connected with said conduit, a socket adapted to hold a safety lamp, and a conduit connecting said socket with opposite ends of said chamber through valved unions.

2. A portable apparatus for testing mine gases comprising a tubular chamber provided with valved inlet and exhaust connections at either end, a plunger reciprocable within said chamber, and an annular socket connected with said exhaust connections and provided with a channel to connect with the inlet of a gas indicator.

3. A portable apparatus for testing mine gases comprising a tubular chamber provided with valved inlet and exhaust connections, a plunger reciprocable within said chamber, and an annular socket connected with said exhaust connections having a channel arranged to connect with the air-inlet of a safety lamp.

4. In a portable apparatus for the detection of combustible gases, a pump having valved inlet and exhaust connections, a pipe connected with said inlet connections, and a socket connected with said exhaust connections having a channel arranged to connect with the air-inlet of a safety lamp.

In testimony whereof I affix my signature in presence of two witnesses.

JOSEPH SMITH.

Witnesses:
  C. J. McKeen,
  S. T. Jones.